(12) United States Patent
Jager

(10) Patent No.: US 8,011,325 B2
(45) Date of Patent: Sep. 6, 2011

(54) FLOATABLE PET TOY

(75) Inventor: Claudius Jager, Boulder, CO (US)

(73) Assignee: Artemis Rubber Technology Inc., Longmont, CO (US)

( * ) Notice: Subject to any disclaimer, the term of this patent is extended or adjusted under 35 U.S.C. 154(b) by 350 days.

(21) Appl. No.: 12/115,653

(22) Filed: May 6, 2008

(65) Prior Publication Data

US 2009/0277395 A1    Nov. 12, 2009

(51) Int. Cl.
*A01K 15/02* (2006.01)
*A01K 29/00* (2006.01)

(52) U.S. Cl. ........................................................ 119/707
(58) Field of Classification Search .................. 119/702, 119/707–711; D30/160; 43/3, 43.1
See application file for complete search history.

(56) References Cited

U.S. PATENT DOCUMENTS

| | | | | |
|---|---|---|---|---|
| 3,830,202 A * | 8/1974 | Garrison | ........................ | 119/709 |
| 5,706,762 A * | 1/1998 | Dokken | ........................ | 119/712 |
| 5,865,146 A * | 2/1999 | Markham | ........................ | 119/707 |
| 5,904,118 A | 5/1999 | Markham | | |
| 6,439,166 B1 * | 8/2002 | Markham | ........................ | 119/710 |
| 6,602,101 B2 * | 8/2003 | deDoes | ........................ | 441/1 |
| 6,681,721 B1 * | 1/2004 | Buschy | ........................ | 119/709 |
| 6,688,258 B1 * | 2/2004 | Kolesar | ........................ | 119/710 |
| D496,137 S * | 9/2004 | Byrne | ........................ | D30/160 |
| D517,752 S * | 3/2006 | Byrne | ........................ | D30/160 |
| 7,389,748 B2 * | 6/2008 | Shatoff et al. | ........................ | 119/707 |
| 2005/0045115 A1 * | 3/2005 | Mann | ........................ | 119/711 |
| 2006/0225667 A1 * | 10/2006 | Handelsman et al. | ........................ | 119/710 |
| 2007/0289553 A1 * | 12/2007 | Jager | ........................ | 119/710 |
| 2008/0141948 A1 * | 6/2008 | Renforth et al. | ........................ | 119/710 |
| 2008/0254693 A1 * | 10/2008 | Zogg | ........................ | 441/84 |
| 2009/0000565 A1 * | 1/2009 | Bryce | ........................ | 119/707 |
| 2010/0064983 A1 * | 3/2010 | Ritchey et al. | ........................ | 119/707 |

* cited by examiner

*Primary Examiner* — Son T. Nguyen
(74) *Attorney, Agent, or Firm* — Robert W. Becker; Robert Becker & Assoc.

(57) ABSTRACT

A floatable pet toy comprising a hollow outer member, a sealed buoyant flotation bladder, and a rope section. The hollow outer member is made of rubber or polymeric material and has an inner cavity. The flotation bladder is disposed in the inner cavity of the outer member. A first end of the rope section is connected or anchored to the flotation bladder or to a washer disposed in the cavity, and a second end of the rope section extends beyond the outer member.

6 Claims, 4 Drawing Sheets

FLOATABLE PET TOY

BACKGROUND OF THE INVENTION

The present invention relates to a floatable pet toy and to a method of making such a toy.

SUMMARY OF THE INVENTION

The floatable pet toy of the present application comprises a hollow outer member that is made of rubber or polymeric rubber and has an inner cavity; a sealed buoyant flotation bladder disposed in the inner cavity of the outer member; and a rope section having a first end operatively connected or anchored to the flotation bladder or to a washer disposed in the cavity, and a second end that extends beyond the outer member.

Further specific features of the present invention will be described in detail subsequently.

BRIEF DESCRIPTION OF THE DRAWINGS

Several embodiments of the floatable pet toy of the present application are illustrated in the drawings, which are presented by way of example only, and in which.

DESCRIPTION OF SPECIFIC EMBODIMENTS

Figure 1:
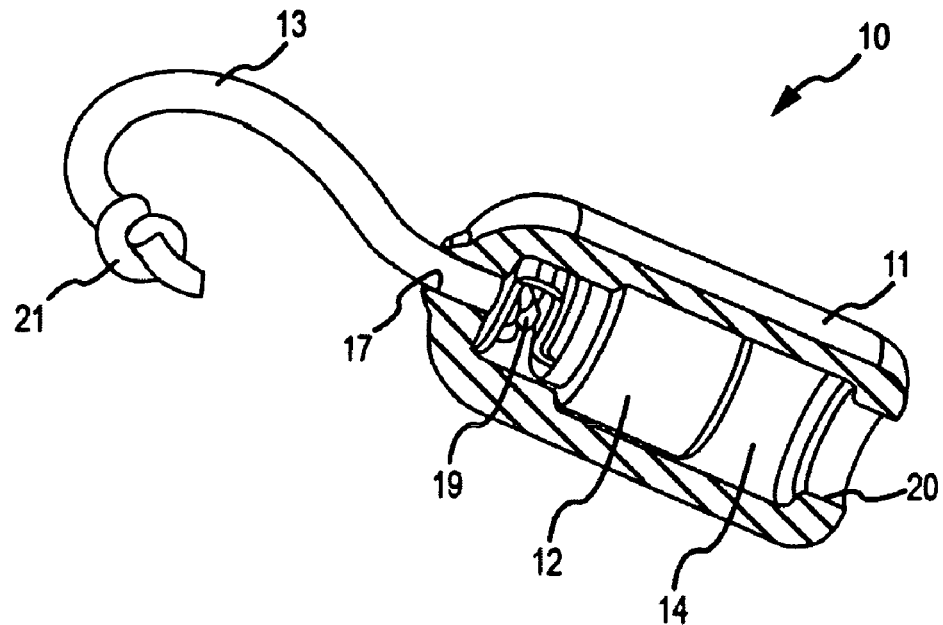
FIG. 1 is a cross-sectional view of a floatable pet toy of the present invention with a first exemplary embodiment of a sealed buoyant flotation bladder.
Figure 2:
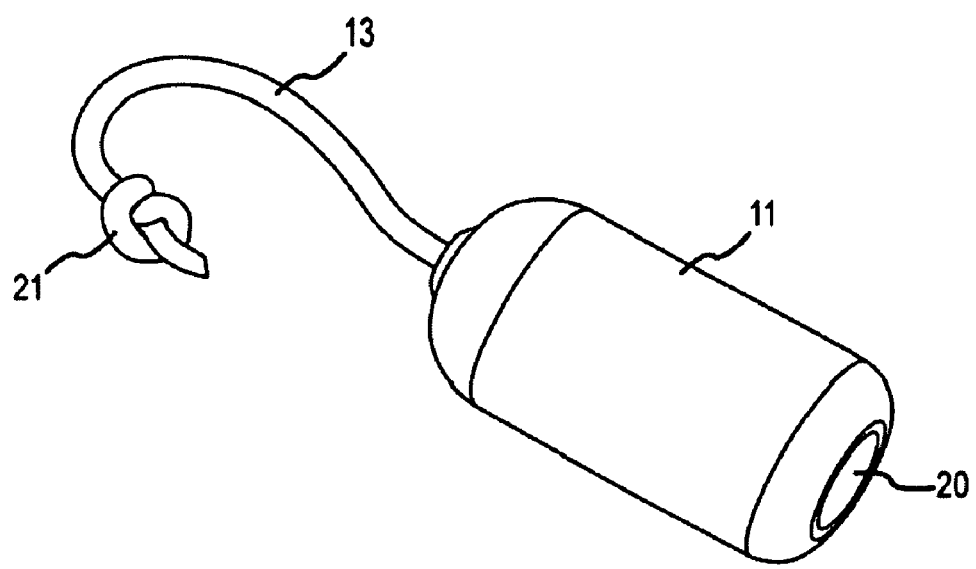
FIG. 2 is an isometric view of a floatable pet toy.

Referring now to the drawings in detail, the first embodiment of the floatable pet toy of the present application is shown in FIGS. 1-4, and is designated generally by the reference numeral 10. The floatable pet toy 10 is comprised of three main components, namely a hollow outer member 11, a sealed, i.e. airtight, buoyant flotation bladder 12, and a rope section 13.

The hollow outer member 11 is made of rubber or polymeric material such as, by way of example only, natural rubber or a thermoset rubber, for example SBR rubber having a Shore A hardness of 25-85, or some other strong, tough elastomeric material in order to withstand the rough play from an animal. The hollow outer member 11 need not necessarily be buoyant by itself. In other words, the hollow outer member 11 can have a specific gravity that is greater than 1.

As can be seen from FIG. 1, the hollow outer member 11 has a cavity 14. The flotation insert or bladder 12 is disposed in this cavity 14, especially in a somewhat form-fitting manner. The hollow flotation bladder 12 is blow molded or injection molded, and is made of a flexible and deformable material. A presently preferred material is LDPE (low-density polyethylene). However, other materials could also be used for the flotation bladder 12 as long as they have a specific gravity that is less than 1 and are water resistant, so that the flotation bladder 12, and hence the floatable pet toy 10 as a whole, can float in water. Such other materials can, by way of example only, be polypropylene, latex, polyurethane, or ABS resin.

Figure 3:
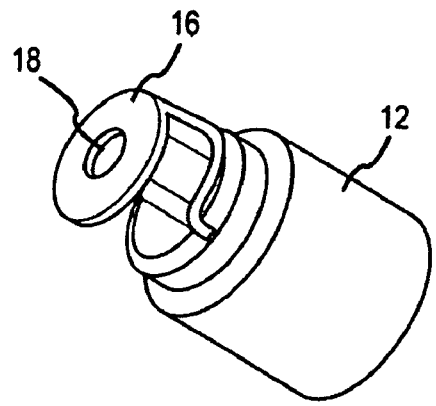
FIGS. 3 and 4 show exemplary embodiments of a flotation bladder with a yoke.
Figure 4:
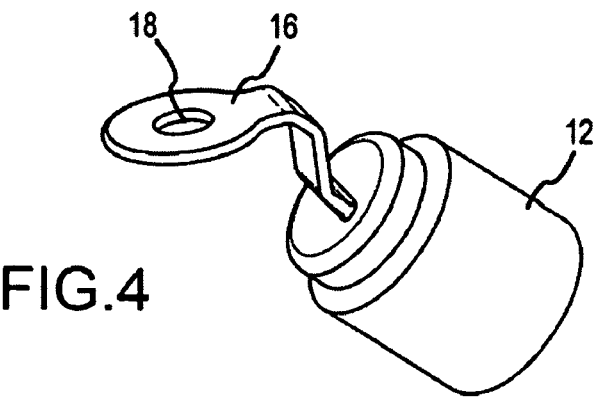

The flotation bladder 12 is provided with an integral or monolithic yoke 16, which can be best seen from the two exemplary configurations illustrated in FIGS. 3 and 4. The yoke 16 serves for the connection or anchoring of the rope section 13 to the flotation bladder 12. In particular, prior to inserting the flotation bladder 12 into the cavity 14 of the hollow outer member 11, one end of the rope section 13, in a manner to be described in detail subsequently, is forced through a hole 17 at one end of the hollow outer member 11. This end of the rope section 13 is then funneled or placed through an eyelet 18 in the yoke 16, whereupon the end of the rope section 13 is knotted, as represented by the reference numeral 19 in FIG. 1. The rope section 13 is then pulled snuggly against the yoke 16, but is now prevented from being pulled through the yoke due to the smaller size of the eyelet 18 relative to the knot 19. While pulling on the rope section 13 to take up any slack, the flotation bladder 12 is placed into the cavity 14 of the hollow outer member 11, through the hole 20 provided at the other end of the outer member 11, assuming the position shown in FIG. 1. As furthermore shown in FIGS. 1 and 2, the other end of the rope section 13 can also be provided with a knot, as represented by the reference numeral 21, if desired. This can make it easier to hold the rope section 13, both for the purpose of pulling the rope section through the hole 17 of the hollow outer member 11 during disposition of the flotation bladder 12 in the cavity 14 of the hollow outer member, as well as for play by a dog or other animal. The flotation bladder is also protected by the more rigid outer member 11.

As can be seen in the embodiment illustrated in FIG. 1, the flotation bladder 12 is substantially shorter in length than is the hollow outer member 11. Thus, when the flotation bladder 12 is pulled well up into the cavity 14 of the hollow outer member 11, the flotation bladder is protected from being punctured, for example by being chewed on by a dog or other animal that is playing with the toy.

With regard to the inserting of one end of the rope section 13 through the hole 17 of the hollow outer member 11, the rope section 13 is preferably a large weave, braided rope that can be easily compressed to reduce its diameter. In the non-compressed state, the diameter of the rope section 13 is greater than the diameter of the hole 17 of the hollow outer member 11. Therefore, to force the one end of the rope section 13 through the hole 17 in order to attach this end of the rope section to the yoke 16 of the flotation bladder 12, the rope section 13 is compressed at this location. When the compression is released, the rope section 13 again expands. Since the diameter of the rope section 13 is greater than the diameter of the hole 17, the rope section is now securely held in the hole 17 via a frictional fit, thus securely holding the flotation bladder 12 in place within the cavity 14 of the hollow outer member 11.

Figure 5:
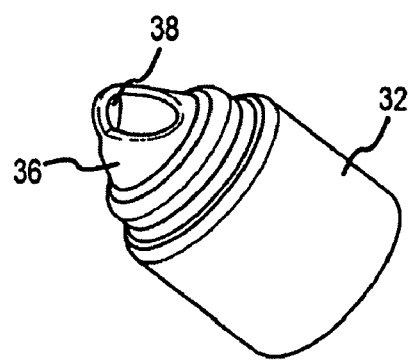
FIG. 5 shows another exemplary embodiment of a flotation bladder of the present invention.

Another exemplary embodiment of a sealed, buoyant flotation bladder for the floatable pet toy 10 of the present application is illustrated in FIG. 5, and is designated generally by the reference numeral 32. In this embodiment rather than being provided with a yoke 16 for the connection of one end of the rope section 13, the flotation bladder 32 is provided with a projection 36 having an eyelet 38 for receiving one end of the rope section 13, which is then retained in the eyelet 38 by being knotted, similar to the knot 19 of the embodiment illustrated in FIG. 1. In other respects, the flotation bladder 32 is comparable to the flotation bladder 12.

Figure 6:
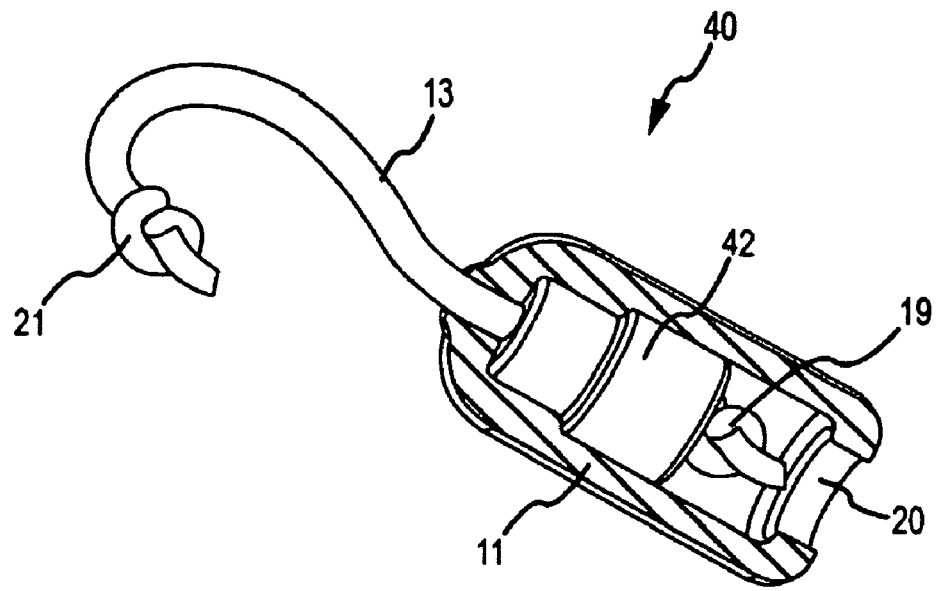
FIG. 6 is a cross-sectional view of a floatable pet toy of the present invention with a further exemplary embodiment of a flotation bladder.
Figure 7:
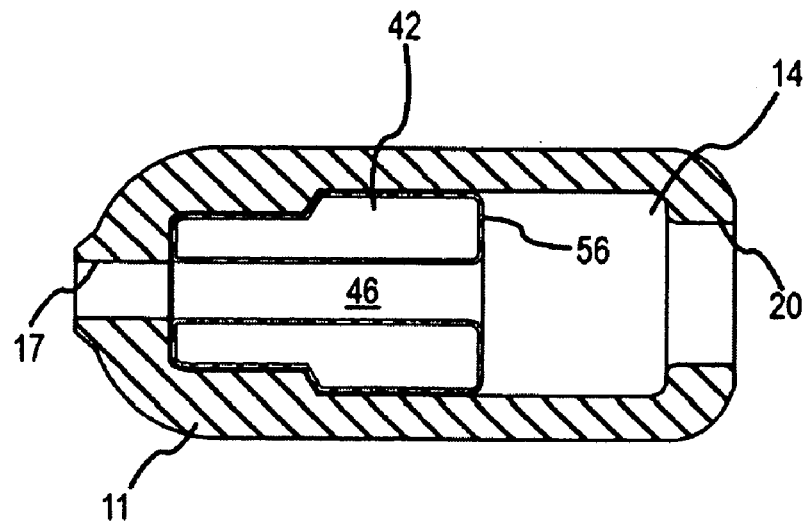
FIG. 7 is a cross-sectional view through the outer member and the flotation bladder of the embodiment of FIG. 6.

Yet another exemplary embodiment of a sealed, buoyant flotation bladder for a floatable pet toy 40 of the present application is illustrated in FIGS. 6 and 7, and is designated generally by the reference numeral 42. In this embodiment, the means for the connection or anchoring of one end of the rope section 13 is provided by the central portion or core 46 of the flotation bladder 42 in conjunction with the end face 56 of the flotation bladder. In particular, in this embodiment not only is the flotation bladder 42 hollow, but it also has a central portion or core 46 through which the rope section 13 is inserted, with a knot 19 at the end of the rope section 13 then being adapted to be pulled against the end face 56 of the flotation bladder 32. Although in FIG. 7 the diameter of the core 46 is shown as being substantially the same as the diameter of the hole 17 in the hollow outer member 11, the diameter of the core 46 can also be larger, as long as it is less than the size of the knot 19 so that the rope section 13 cannot be pulled back through the flotation bladder 42 when the external portion of the rope section 13 is pulled upon. With a smaller diameter core, the rope section can hold the flotation bladder 42 in place in any desired position via friction, and the rope section could extend out of both ends of the flotation bladder if desired.

Figure 8:
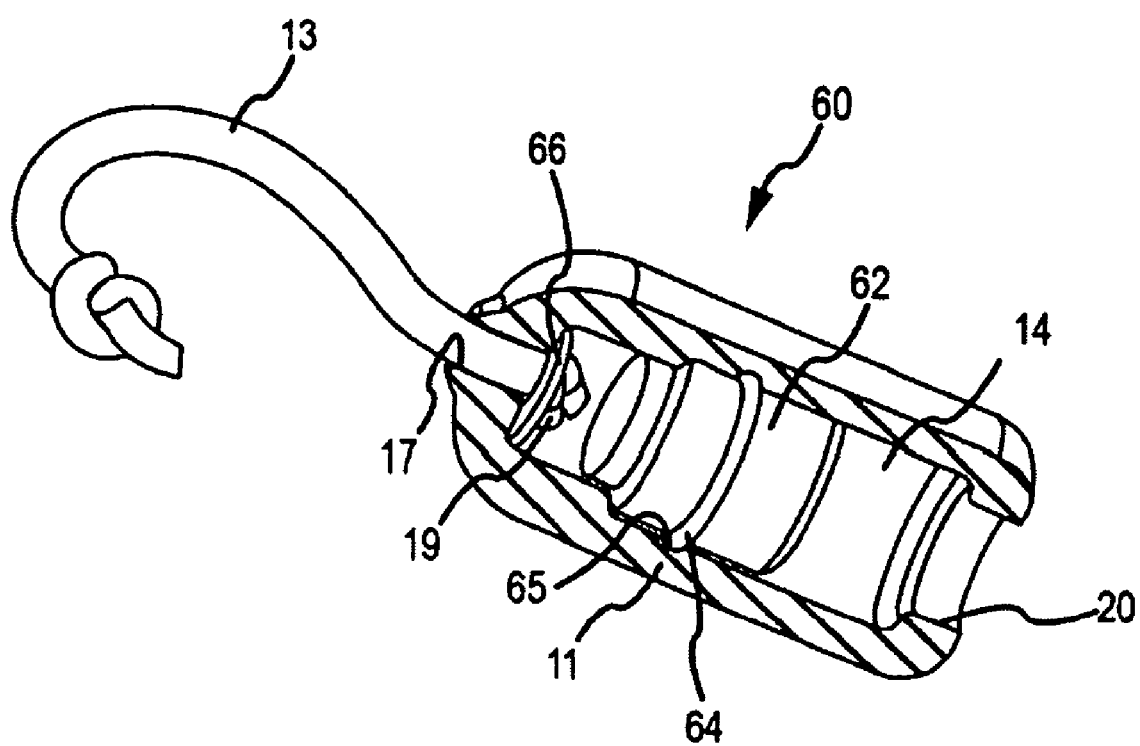
FIG. 8 is a cross-sectional view of a floatable pet toy of the present invention with another exemplary embodiment of a means for anchoring a rope section.

Another exemplary embodiment of a floatable pet toy 60 of the present application is illustrated in FIG. 8. In this embodiment, the means for the connection or anchoring of one end of the rope section 13 is in the form of a separate washer 66 that is disposed in the cavity 14 of the outer member 11, and in particular between the hole 17 of the outer member and the flotation bladder 62. Similar to the situation of the yoke 16 shown in the embodiments of FIGS. 3 and 4, prior to inserting the flotation bladder 62 into the cavity 14 of the hollow outer member 11, one end of the rope section 13 is forced through the hole 17 at the one end of the hollow outer member 11. This end of the rope section 13 is then funneled or placed through a hole in the washer 66, whereupon the end of the rope section 13 is knotted to provide the knot 19. The rope section 13 is then pulled snuggly against the washer 66, but is prevented from being pulled through the washer due to the smaller size of the hole therein relative to the knot 19. The flotation bladder 62 can then be introduced into the cavity 14 of the hollow outer member 11.

In this embodiment of the floatable pet toy 60 of the present application, the flotation bladder 62 can be held in place within the cavity 14 of the hollow outer member 11 merely by appropriately corresponding shapes of the inner surfaces of the outer member and the outer surfaces of the flotation bladder. For example, appropriate inflation of the flotation bladder 62 can provide an outer dimension thereof that is slightly greater than an inner dimension of the outer member 11, providing a snug and secure fit of the flotation bladder 62 within the outer member 11. Alternatively, or in addition thereto, a bead 64 can be provided on the outer surface of the flotation bladder 62 that can engage in a groove 65 provided on the inner surface of the outer member 11. Conversely, a bead can be provided on the inner surface of the outer member 11 with a corresponding groove being provided on the outer surface of the flotation bladder 62. It should be understood that these means for holding the flotation bladder in place within the cavity 14 of the outer member 11 could, of course, also be employed with the previously described embodiments.

With regard to the insertion or introduction of the various flotation bladders 12, 32, 42, 62 into the cavity 14 of the hollow outer member 11, this is accomplished by compressing the flexible or deformable inflation bladder and/or by stretching the hole 20 in the end of the outer member 11 more open.

The present invention is, of course, in no way restricted to the specific disclosure of the specification and drawings, but also encompasses any modifications with the scope of the appended claims.

What I claim is:

1. A floatable pet toy, comprising:
   a hollow outer member that is made of rubber or polymeric material and has an inner cavity; a sealed, buoyant, and deformable flotation bladder disposed in said inner cavity of said outer member, wherein said outer member has a second hole for receiving said flotation bladder therethrough; a rope section having a first end extending into said inner cavity of said outer member, and a second end that extends beyond said outer member, wherein said rope section is frictionally secured to said outer member via contact with surfaces of said first hole, wherein said outer member has a first hole through which said rope section extends, wherein said rope section, in a non-compressed state thereof, has a diameter that is greater than the diameter of said first hole; and a monolithic yoke having an eyelet disposed within said inner cavity of said outer member for receiving said first end of said rope section therethrough, wherein said monolithic yoke is provided on the said flotation bladder; wherein said first end of said rope section is knotted, further wherein said knotted first end rests against said monolithic yoke within said inner cavity of said outer member.

2. A floatable pet toy according to claim 1, wherein said flotation bladder has an outer surface that corresponds at least in part to the configuration of an inner surface of said inner cavity of said outer member.

3. A floatable pet toy according to claim 1, wherein said deformable flotation bladder is also flexible.

4. A floatable pet toy according to claim 3, wherein said flotation bladder is made of a material selected from the group consisting of low-density polyethylene, polypropylene, latex, polyurethane, and ABS resin.

5. A floatable pet toy according to claim 3, wherein said outer member is made of a material selected from the group consisting of natural rubber and thermoset rubber.

6. A floatable pet toy according to claim 1, wherein said outer member is more rigid than is said flotation bladder.

* * * * *